(12) United States Patent
Ozguner et al.

(10) Patent No.: US 9,747,225 B2
(45) Date of Patent: Aug. 29, 2017

(54) INTERRUPT CONTROLLER

(71) Applicant: MICROSOFT TECHNOLOGY LICENSING, LLC, Redmond, WA (US)

(72) Inventors: Tolga Ozguner, Redmond, WA (US); Robert Allen Shearer, Woodinville, WA (US); Elene Terry, Duvall, WA (US); Jonathan Ross, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 14/704,092

(22) Filed: May 5, 2015

(65) Prior Publication Data

US 2016/0328339 A1    Nov. 10, 2016

(51) Int. Cl.
*G06F 13/24* (2006.01)
*G06F 13/32* (2006.01)
*H05K 7/10* (2006.01)
*G06F 13/16* (2006.01)

(52) U.S. Cl.
CPC .......... *G06F 13/1668* (2013.01); *G06F 13/24* (2013.01)

(58) Field of Classification Search
CPC .......... G06F 13/24; G06F 13/26; G06F 13/32; G06F 9/4812
USPC ........................................ 710/260–269, 301
See application file for complete search history.

(56) References Cited

U.S. PATENT DOCUMENTS

| | | | |
|---|---|---|---|
| 5,568,649 A | 10/1996 | MacDonald et al. | |
| 5,590,315 A * | 12/1996 | Hess | G06F 3/038 703/25 |
| 5,644,772 A * | 7/1997 | Mann | G06F 9/462 710/260 |
| 5,708,813 A * | 1/1998 | Cho | G06F 13/24 710/260 |
| 5,987,538 A | 11/1999 | Tavallaei et al. | |
| 6,029,223 A | 2/2000 | Klein | |
| 6,205,508 B1 | 3/2001 | Bailey et al. | |

(Continued)

FOREIGN PATENT DOCUMENTS

| | | |
|---|---|---|
| EP | 0368655 | 5/1990 |
| EP | 1865415 | 12/2007 |

OTHER PUBLICATIONS

Office Action dated Mar. 1, 2016, U.S. Appl. No. 14/574,093.

(Continued)

*Primary Examiner* — Faisal M Zaman
(74) *Attorney, Agent, or Firm* — Vierra Magen Marcus LLP

(57) ABSTRACT

An interrupt controller includes a fabric slave that can receive MMIO operation requests, a plurality of output interrupt lines, a plurality of interrupt registers with each interrupt register corresponding to an output interrupt line, a MMIO routing circuit in communication with the fabric slave and the interrupt registers, a plurality of input interrupt lines for receiving line interrupts, and a line interrupt routing circuit in communication with the input interrupt lines and the interrupt registers. The interrupt registers store data for an interrupt that serves as an indication of the source of the interrupt and/or what task(s) need to be done for the interrupt.

20 Claims, 10 Drawing Sheets

(56) References Cited

U.S. PATENT DOCUMENTS

| | | | |
|---|---|---|---|
| 6,222,846 B1* | 4/2001 | Bonola | G06F 9/32 370/402 |
| 6,370,606 B1 | 4/2002 | Bonola | |
| 6,400,830 B1 | 6/2002 | Christian | |
| 6,539,448 B1* | 3/2003 | Deng | G06F 13/26 710/260 |
| 7,689,747 B2 | 3/2010 | Vega et al. | |
| 7,725,637 B2 | 5/2010 | Kumar et al. | |
| 8,312,198 B2 | 11/2012 | Tiruvallur et al. | |
| 8,687,903 B1 | 4/2014 | Hernandez | |
| 2005/0080970 A1* | 4/2005 | Jeyasingh | G06F 9/45533 710/266 |
| 2005/0228922 A1* | 10/2005 | Tsao | G06F 9/4812 710/268 |
| 2007/0043936 A1* | 2/2007 | Day | G06F 13/24 712/244 |
| 2008/0222333 A1* | 9/2008 | Barry | G06F 9/3861 710/260 |
| 2011/0072181 A1* | 3/2011 | Lu | G06F 11/0745 710/266 |
| 2011/0219208 A1 | 9/2011 | Asaad et al. | |
| 2011/0296074 A1* | 12/2011 | Nordstrom | G06F 13/404 710/312 |
| 2011/0302349 A1* | 12/2011 | Griggs | G06F 13/26 710/311 |
| 2013/0322762 A1 | 12/2013 | Zeng | |
| 2014/0136746 A1* | 5/2014 | Tiruvallur | G06F 13/26 710/269 |
| 2015/0143016 A1* | 5/2015 | Egi | G06F 13/32 710/313 |
| 2015/0261709 A1* | 9/2015 | Billi | G06F 13/404 710/316 |
| 2016/0140064 A1* | 5/2016 | Chin | G06F 13/26 710/119 |
| 2016/0299858 A1* | 10/2016 | Ching | G06F 13/24 |

OTHER PUBLICATIONS

Response to Office Action dated Mar. 24, 2016, U.S. Appl. No. 14/574,093.

Office Action dated May 5, 2016, U.S. Appl. No. 14/574,093.

PCT International Search Report and Written Opinion of the International Searching Authority dated Mar. 1, 2016, PCT Patent Application No. PCT/US2015/063563.

Sulzbachner, et al., "An Embedded High Performance Data Acquisition and Pre-Processing Interface for Asynchronous Event-Based Silicon Retina Data," 2010 IEEE/ASME International Conference on Mechatronic and Embedded Systems and Applications (MESA 2010) IEEE Piscataway, NJ,USA, Jul. 15, 2010.

Seiler, et al, "Integrating Video Rendering Into Graphics Accelerator Chips," Digital Technical Journal, Maynard, MA, US, vol. 7, No. 4, Jan. 1, 1995.

Heuring, et al., "Compute Systems Design and Architecture," 1997, Addison-Wesley, Menlo Park, CA, USA.

Caselle, et al., "Ultra-Fast Streaming Camera Platform for Scientific Applications," Real Time Conference (RT), 2012, 18th IEEE-NPSS, Jun. 9, 2012.

Lin, et al., "Empowering automotive vision with TI's Vision AccelerationPac," Texas Instruments White Paper, Oct. 2013.

PCT International Search Report and Written Opinion of the International Searching Authority dated May 31, 2016, PCT Patent Application No. PCT/US2016/026299.

Dall, et al., "KVM/ARM: Experiences Building the Linux ARM Hypervisor", In Technical Report CUCS-010-13, Apr. 2013, 19 pages.

"Cortex-A9 MPCore Technical Reference Manual", Retrieved on: Feb. 2, 2015. Available at: http://infocenter.arm.com/help/index.jsp?topic=/com.arm.doc.ddi0407e/CCHDBEBE.html.

"Migrating a software application from ARMv5 to ARMv7-A/R Version: 1.0", Retrieved on: Feb. 2, 2015 Available at: http://infocenter.arm.com/help/topic/com.arm.doc.dai0425/DAI0425__migrating__an__application__from__ARMv5__to__ARMv7__AR.pdf.

"PrimeCell® Vectored Interrupt Controller (PL190)—Technical Reference Manual", Published on: Mar. 2, 2013, Available at: http://infocenter.arm.com/help/topic/com.arm.doc.ddi0181e/DDI0181.pdf.

Radhakrishnan, et al., "The Blackford Northbridge Chipset for the Intel 5000", In IEEE Micro, vol. 27, Issue 2, Mar. 2007, 12 pages.

"AMBA 3 APB Protocol—Specification," Aug. 17, 2004, 34 pages.

"ARM Generic Interrupt Controller—Architecture Specification," Sep. 23, 2008, 154 pages.

* cited by examiner

Figure 4

| 14 | 13 | 12 | 11 | 10 | 9 | 8 | 7 | 6 | 5 | 4 | 3 | 2 | 1 | 0 |
|----|----|----|----|----|---|---|---|---|---|---|---|---|---|---|
| Reg | Processor ID | | | | | | | Interrupt Line | | | Write Mode | | 0 | 0 |

Figure 5

| Field | Description |
|-------|-------------|
| Reg | 0= Interrupt Registers, 1= Configuration Registers |
| Processor ID | Destination of the Interrupt. Valid values are b0000000 to b0011010 and b1111111 for MSI |
| Interrupt Line | Output Interrupt Line of the destination Processor. |
| Write Mode | 00= write. MMIO data is fully written<br>01=set. MMIO data is logically OR'd with existing data<br>10=reset. MMIO data is inverted and AND'd with the existing data<br>11=reserved |

INTERRUPT CONTROLLER

BACKGROUND

In many computer systems, including Systems On a Chip (SOC), hardware devices (processor cores, network cards, printers, other peripheral devices, etc.) communicate with the processor cores and other entities through interrupts. Traditionally, interrupts have been asserted using direct line connections to an interrupt input of a processor core (or other device).

SUMMARY

An interrupt controller is proposed that does not require many direct lines. Although the interrupt controller can have some direct lines, interrupts can also be Memory Mapped Input/Output (MMIO) based, where the source of the interrupt uses a standard fabric/bus write to send an interrupt. To provide flexibility in the supported feature set, the interrupt controller includes a set of MMIO readable interrupt registers to allow the interrupt targets to later determine data or messages about the interrupt. Routing circuitry is used to route messages/data about the interrupt to the appropriate interrupt register so that the messages/data can be persistently maintained, and multiple entities can send interrupts to a common target.

One embodiment of an interrupt controller includes a fabric (e.g., bus) slave that can receive MMIO operation requests, a plurality of output interrupt lines, a plurality of interrupt registers with each interrupt register corresponding to an output interrupt line, a MMIO routing circuit in communication with the fabric slave and the interrupt registers, a plurality of input interrupt lines for receiving line interrupts, and a line interrupt routing circuit in communication with the input interrupt lines and the interrupt registers. The interrupt registers store data for an interrupt such that the data serves as an indication of the source of the interrupt and/or what task(s) need to be done for the interrupt. Some embodiments, may implement a subset of the above-listed components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 depicts one example of a MMIO address format used to assert an interrupt.

FIG. 5 is a table that describes the mapping of bits from the example address format of FIG. 4.

DETAILED DESCRIPTION

Figure 1:
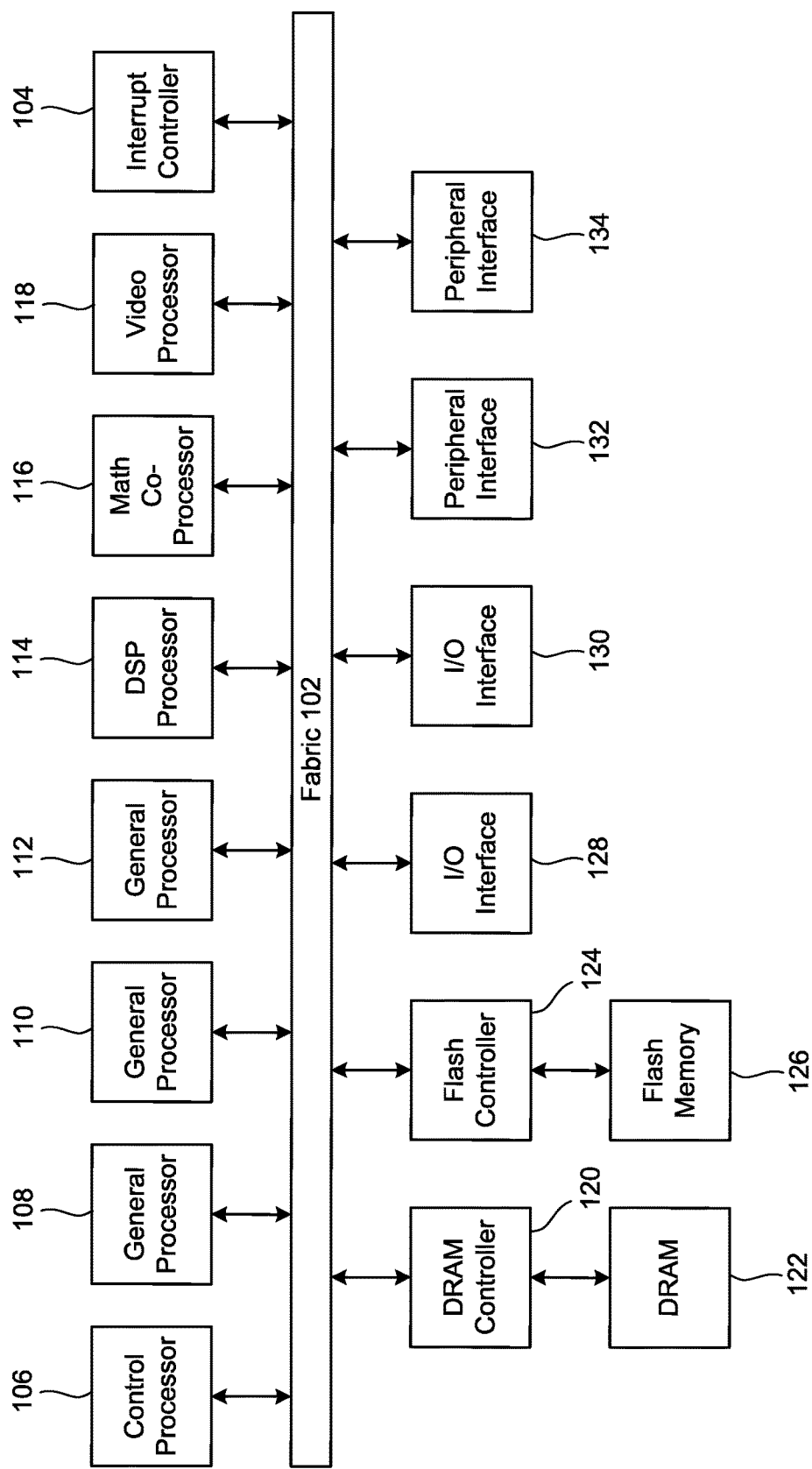
FIG. 1 is a block diagram of an example computing system that includes an interrupt controller.

Traditionally, interrupts have been asserted using direct line connections to an interrupt input of a processor core (or other device). Memory Mapped Input/Output (MMIO) operations can also be used to assert interrupts. However, while there are several kinds of interaction between each processor core and the other hardware in the system, all such interactions initiated from outside the core are funneled through a single, simple interrupt delivery mechanism, or relatively small number of interrupt delivery mechanisms. Moreover, in traditional systems the number of interrupt signals is very limited, which makes it necessary to group events together under a single common interrupt for each group. Thus, when the processor core software receives an interrupt, it must take several steps to identify the cause and context of the interrupt since some existing interrupt delivery mechanisms generally have limited provisions for reliably identifying the source or cause of an interrupt. as well as work that needs to be done for the interrupt.

To better manage interrupts, many systems make use of an interrupt controller, which is a device that serves as a hub for interrupts. Entities that wish to assert an interrupt will contact the interrupt controller, which will receive the request for an interrupt and make the appropriate interrupt based on a set of factors. For example, the interrupt controller may assign priority to some interrupts, arbitrate among competing interrupts, and route interrupts. Because interrupt controllers can become quite complex as the number of supported features increases, many interrupt controllers are designed with a limited feature set.

Technology is described herein for an interrupt controller that is generic to processor core architecture, flexible in features that it can support and scalable to accommodate many entities that need to send and receive interrupts. The disclosed interrupt controller can receive multiple types of interrupts (e.g., line interrupts and MMIO interrupts). In one embodiment, a set of interrupt registers (or other storage devices) are used to persistently maintain messages or data associated with the interrupts in a manner such that messages/data can be maintained (without data destruction) for multiple interrupts to the same target, and the messages/data will remain available until the target of the interrupt (or other devices) actively resets the interrupt register. The use of the persistently stored messages provides for the flexibility in the feature set that can be supported by the interrupt controller.

In one embodiment, the interrupt controller is a slave on a fabric. One example of a fabric is a bus or set of busses. One example of a suitable bus is the AMBA peripheral bus (APB). However, other types of buses or fabrics can also be used. In this embodiment, the interrupt controller can receive MMIO write requests from the APB and drive the appropriate level sensitive interrupt line to one of the on chip interrupt destinations, as determined by the address of the MMIO write. In one example implementation, the fabric or bus includes four bytes for write data, four bytes for read data, and a four byte address. The interrupt controller stores four bytes of data in one of its MMIO readable interrupt registers. The MMIO writes will result in any of the following functions being performed, as determined by a portion of the MMIO address: a full write (overwriting any content in the interrupt register with the new data), a masked set (where the new data is bitwise ORed with the current content of the interrupt register), or a masked clear (where the new data is bitwise inverted and ANDed with the current content of the interrupt register). A logical OR of the content in the interrupt register will be used to set the interrupt; therefore, one bit of the interrupt register has to be written to a logic one to cause an interrupt.

Additionally, in one embodiment, the interrupt controller can receive interrupt pulses or levels from a source, as an input line interrupt, and redirect them to the proper output interrupt line. Each input line interrupt will go through a synchronization and edge detect. All writes to the interrupt register from input line interrupt lines are sticky in that once a bit is set it will remain set until cleared. In one embodiment, the routing between line interrupt input lines and interrupt output lines is configurable. For example, a configuration register or software can be used to configure a line interrupt routing circuit to route input line interrupts to interrupt registers for the output interrupt lines.

The proposed interrupt controller can implement many different use cases. For example, a single processor to processor interrupt, with message passing, can be implemented. That is, a single processor, or other MMIO capable bus master (also known as a source), can send an interrupt by writing a non-zero value to the appropriate interrupt register corresponding to the processor and interrupt line of the desired target. The proper address can be determined by adding an offset (discussed below) to the interrupt controller base address. The source of the interrupt is free to send any useful data as long as at least one bit is set to one. This data can be configurable by hardware or software, and will be read by the destination processor (target) and, therefore, can be used to pass a message from the source to the target.

Another use case supported is multiple processor to processor interrupts. For example, if multiple sources are mapped to the same target, care must be taken to not overwrite the data in the interrupt registers when sending the MMIO write (or line interrupts). The MMIO write should be performed, as discussed below, so that the existing data is not destroyed. This will result in only the bits set to one in the write data, plus existing bits in the register already at logic one, being set to logic one in the interrupt register. In one embodiment, the bits of the interrupt registers can be divided up per source. In other embodiments, the bits of the interrupt registers can be divided up by task. For example, a bit in the interrupt register can be an indication for the target to access data at a particular location main memory. That particular location main memory can include more information about the interrupt. In other embodiments, the bits of the interrupt registers can be divided up by a combination of source and task. The bits of the interrupt register can also be divided up or assigned based on other criteria.

The destination for inline interrupts are configured based on a line interrupt routing circuit and/or configuration register. There can be multiple configuration registers, including one configuration register for each direct line interrupt input. In one embodiment, each input line interrupt can result in one bit being set in the appropriate interrupt register. In that case, the routing circuitry, described below, will create a full byte message where all the bits are logic zero except for one bit set to logic one. In other embodiments, multiple bits of the interrupt register can be set to logic one based on the interrupt input line. In other embodiment, a setting a bit can include that bit being at logic zero, rather than logic one.

FIG. 1 is an example computing system that can be used with the proposed interrupt controller. In one embodiment, FIG. 1 represents a System on a Chip (SoC). However in other implementations, the computing system in FIG. 1 can be implemented on one or more printed circuit boards and does not necessarily need to be a SoC. The computing system of FIG. 1 includes fabric 102 for interconnecting the various entities or components. In one embodiment, fabric 102 is a set of one or more buses and/or interconnects. In one example implementation, fabric 102 includes a 32 bit address bus, 32 bit write data bus and 32 bit read data bus. Interconnected by fabric 102 are interrupt controller 104, control processor 106, general processor 108, general processor 110, general processor 112, DSP processor 114, math co-processor 116, video processor 118, DRAM controller 120, flash controller 124, I/O interface 128, I/O interface 130, peripheral interface 132 and peripheral interface 134.

In one example implementation, control processor 106 is the main processor for controlling the system of FIG. 1. Interrupt controller 104 is the proposed new interrupt controller that will process requests for interrupts, and will be discussed in more detail below. General processors 108, 110 and 112 are programmable CPU cores that can be used to perform various tasks, as per the requirements of the specific implementation. FIG. 1 shows three general processors (108, 110 and 112); however, more or less than three general processors can be used. In one embodiment, 32 general processors can be implemented in the system. Interrupt controller 104 is scalable and can accommodate any number of general processors.

DSP processor 114, math co-processor 116, and video processor 118, are examples of specific/specialty processors that can be included in a computing system. The inclusion of specific/specialty processors and the types of specific/specialty processors included in a system depends on the requirements of the specific implementation. Interrupt controller 104 can be configured to work with many different types of specific/specialty processors, with no particular number or type of specific/specialty processor required.

Each of the processors 106-118 can be implemented using the same architecture or different architectures. Different subsets of those processors can be the same architecture or different architectures. The system in FIG. 1 can include, and interrupt controller 104 can work with, many different processors having different architectures.

The system of FIG. 1 also includes DRAM controller 120 for interfacing with DRAM 122, which serves as main memory. Flash memory controller 124 interfaces with flash memory 126 to provide nonvolatile memory for the system. Interrupt controller 104 can work with one or multiple memory systems, and no particular type of memory system is required.

I/O interfaces 128 and 130 are circuits for connecting the system to input and/or output devices. Although two I/O interfaces are depicted in FIG. 1, more or less than two I/O interfaces can be implemented in the system and supported by interrupt controller 104. FIG. 1 also shows two peripheral interfaces 132 and 134 for interfacing with peripheral devices (e.g., printers, monitors, keyboards, communication devices etc.) In other embodiments more than two peripheral interfaces (and more than two peripherals) can be implemented in the system and supported by interrupt controller 104.

Each of the components 106-134 depicted in FIG. 1 can be a source or a target of an interrupt. Therefore, each of the components 106-134 depicted in FIG. 1 can communicate with interrupt controller 104 via fabric 102; for example, by MMIO write operations and MMIO read operations. Additionally, all or a subset of components 106-134 can have a direct signal line connecting to interrupt controller 104 (outside of fabric 102) serving as an input line interrupt to interrupt controller 104.

Figure 2:
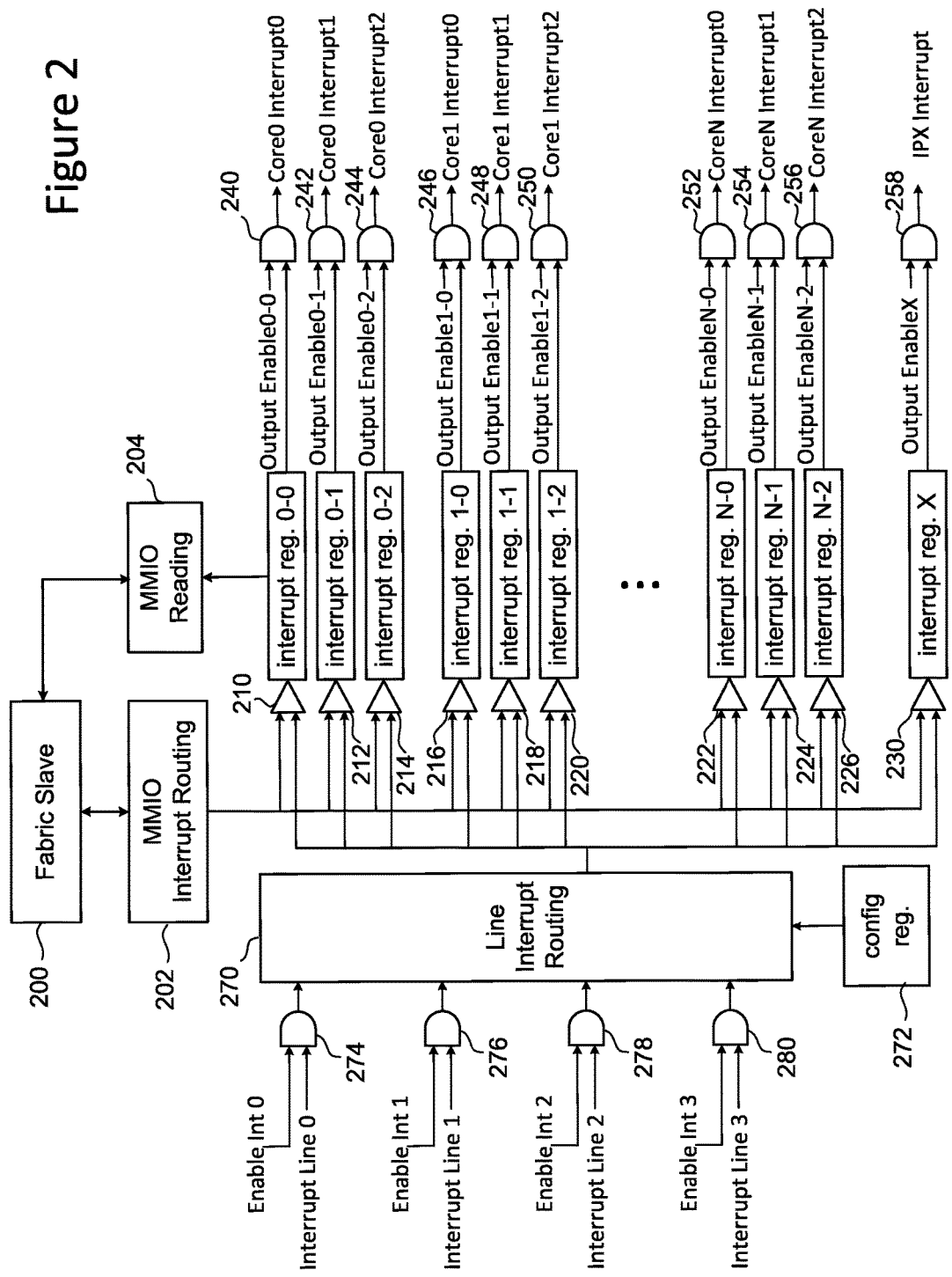
FIG. 2 is a block diagram of one embodiment of an interrupt controller.

FIG. 2 is a block diagram of one embodiment of interrupt controller 104. FIG. 2 shows a fabric slave circuit 200 which connects to and interfaces with fabric 102. Connected to fabric slave circuit 200 are MMIO interrupt routing circuit 202 and MMIO reading circuit 204. FIG. 2 shows a plurality of interrupt registers including interrupt register 0-0, interrupt register 0-1, interrupt register 0-2, interrupt register 1-0, interrupt register 1-1, interrupt register 1-2, interrupt register N-0, interrupt register N-1, interrupt register N-2, and interrupt register X.

Separately for each interrupt register, all of the bits of the interrupt register are OR'd together by an OR gate (or a logical OR circuit that implements a logical OR operation for the 32 bits of the interrupt register) and the output of the OR gate (or logical OR circuit) is connected to an input of an AND gate. The other input to the AND gate is an enable signal that allows the system to disable the output interrupt line. The output of AND gate is the output interrupt line that corresponds to the interrupt register. For example, all of the bits of interrupt register 0-0 are OR'd together and sent to AND gate 240. The other input to AND gate 240 is Output Enable 0-0. The output of AND gate 240 is the output interrupt line labelled as "Core0 Interrupt 0." All of the bits of interrupt register 0-1 are OR'd together and sent to AND gate 242. The other input to AND gate 242 is Output Enable 0-1. The output of AND gate 242 is the output interrupt line labelled as "Core0 Interrupt 1." All of the bits of interrupt register 0-2 are OR'd together and sent to AND gate 244. The other input to AND gate 244 is Output Enable 0-2. The output of AND gate 244 is the output interrupt line labelled as "Core0 Interrupt 2."

All of the bits of interrupt register 1-0 are OR'd together and sent to AND gate 246. The other input to AND gate 246 is Output Enable 1-0. The output of AND gate 246 is the output interrupt line labelled as "Core1 Interrupt 0." All of the bits of interrupt register 1-1 are OR'd together and sent to AND gate 248. The other input to AND gate 248 is Output Enable 1-1. The output of AND gate 28 is the output interrupt line labelled as "Core1 Interrupt 1." All of the bits of interrupt register 1-2 are OR'd together and sent to AND gate 250. The other input to AND gate 250 is Output Enable 1-2. The output of AND gate 250 is the output interrupt line labelled as "Core1 Interrupt 2."

All of the bits of interrupt register N-0 are OR'd together and sent to AND gate 252. The other input to AND gate 252 is Output Enable N-0. The output of AND gate 252 is the output interrupt line labelled as "CoreN Interrupt 0." All of the bits of interrupt register N-1 are OR'd together and sent to AND gate 254. The other input to AND gate 254 is Output Enable N-1. The output of AND gate 254 is the output interrupt line labelled as "CoreN Interrupt 1." All of the bits of interrupt register N-2 are OR'd together and sent to AND gate 256. The other input to AND gate 256 is Output Enable N-2. The output of AND gate 256 is the output interrupt line labelled as "CoreN Interrupt 2."

All of the bits of interrupt register X are OR'd together and sent to AND gate 258. The other input to AND gate 258 is Output Enable X. The output of AND gate 258 is the output interrupt line labelled as "IPX Interrupt."

FIG. 2 explicitly depicts ten output interrupt lines: Core0 Interrupt0, Core0 Interrupt 1, Core0 Interrupt2, Core1 Interrupt0, Core1 Interrupt 1, Core1 Interrupt2, CoreN Interrupt0, CoreN Interrupt 1, CoreN Interrupt2, and IPC Interrupt. Each of these interrupt lines connects to an interrupt input of the corresponding core or non-core block. For example, the output interrupt lines core0 Interrupt0, core0 Interrupt 1 and core0 Interrupt2 are three output interrupt lines that all connect to the same core/processor (core 0). That is, in this example, core 0 has three interrupt inputs which are connected to core0 Interrupt0, core0 Interrupt 1 and core0 Interrupt2.

For example purposes only, FIG. 2 discloses interrupt lines for N cores/processors (Core0, Core1, . . . Core N) as well as for a non-core block (block X). However, the interrupt controller can be used with more or less cores than indicated and more or less blocks that are not cores. FIG. 2 only shows one output interrupt line for the non-core block (block X); however, that is only an example implementation and non-core blocks can have more than one output interrupt line. Similarly, FIG. 2 shows three output interrupt lines for cores; however, that is only an example implementation and cores can have more or less than three output interrupt lines. Also, in other embodiments, different cores can have different numbers of output interrupt lines.

In the embodiment of FIG. 2, there is one interrupt register for every output interrupt line. Thus, each interrupt register corresponds to one output interrupt line. For example, interrupt register 0-0 corresponds to output interrupt line Core0 Interrupt0, interrupt register 0-1 corresponds to output interrupt line Core0 Interrupt1, interrupt register 0-2 corresponds to output interrupt line Core0 Interrupt2, interrupt register 1-0 corresponds to output interrupt line Core1 Interrupt0, etc. In an alternative embodiment, all or a subset of interrupt registers can correspond to more than one output interrupt line. As mentioned above, the interrupt registers each include a set of one or more OR gates (or logical OR circuit) for performing a logic OR operation on all the bits so that if any one bit of the register is at logic one, and the appropriate output enable signal is at logic one, the corresponding output interrupt line will be asserted.

In one embodiment, each interrupt register has 32 bits. However, in other embodiments more or less than 32 bits can be used. In some embodiments, different registers can have different numbers of bits so that not all the registers have the same number of bits. Each bit in the interrupt register can be used to identify one or more tasks that need to be performed in response to an interrupt. Examples of tasks include accessing data in memory, performing a function, fixing a problem, clearing data, etc. Almost any task can be included, as the system is configurable. In some cases each bit corresponds to a source of the interrupt. In other embodiments, multiple sources can share a bit. In some embodiments, the bits of the interrupt registers correspond to a source and task. In other embodiments, the bits in the interrupt registers do not correspond to a source and only correspond to a task to be performed. In one example implementation, the task and/or source associated with each bit in the interrupt register is configured by software. In other embodiments, the bits can be configured by dedicated hardware register or other dedicated hardware.

As discussed above, fabric slave circuit 200 is in communication with fabric 102 for receiving an MMIO address and MMIO write data. Fabric slave circuit 200 can also provide MMIO read data to fabric 102, as discussed below. The received MMIO address and MMIO write data is provided to MMIO interrupt routing circuit 202, which includes decoding circuitry to identify which output interrupt line is being addressed. As discussed above, each address interrupt line corresponds to an interrupt register. Therefore, the MMIO address also points to an interrupt register. MMIO interrupt routing circuit 202 will route the received MMIO data to the address interrupt register. FIG. 2 also shows write mode circuits 210, 212, 214, 216, 218, 220, 222, 224, 226 and 230 between MMIO interrupt routing circuit 202 and the interrupt registers. In one embodiment, write mode circuits 210-230 can be part of MMIO interrupt routing circuitry 202 or can be separated. Circuits 210-230 are used to appropriately write data into the interrupt registers while optionally performing one or more operations on the data.

On the left side of FIG. 2 are a set of input interrupt lines including Interrupt Line 0, Interrupt Line 1, Interrupt Line 2, and Interrupt Line 3. These input interrupt lines implement line interrupts. Although FIG. 2 shows four interrupt lines, a system could have more or less than four interrupt lines. The input interrupt lines are wire connections from other components of the computing system. Each of the input interrupt lines are connected to an AND gate along with an enable signal. For example, Interrupt line 0 and Enable int 0 are connected to AND gate 274, Interrupt line 1 and Enable int 1 are connected to AND gate 276, Interrupt line 2 and Enable int 2 are connected to AND gate 278, and Interrupt line 3 and Enable int 3 are connected to AND gate 280. The outputs of AND gate 274, AND gate 276, AND gate 278 and AND gate 280 are provided to line interrupt routing circuit 270. The enable signals allow the input interrupt lines to be disabled. When enabled, the input interrupt lines are provided to interrupt routing circuit 270, which generates multiple bit data (e.g., 32 bits of data) for an input interrupt line and routes that multiple bit data to the appropriate interrupt register. Configuration register 272 (or multiple configuration registers), or software, can be used to configure the line interrupting routing circuit 270 in order to set which input interrupt lines map to which output interrupt lines (and corresponding interrupt registers), and what multiple bit data is generated for an input interrupt line. In another embodiment, line interrupt routing circuit 270 can be preconfigured (hardwired).

In one embodiment, when line interrupt routing circuit 270 creates the multiple bit data for the interrupt registers, all the bits will be zeros except for one bit which will be logic one. In other embodiments, more than one bit can be logic one. The 32 bits of information are then routed to the appropriate interrupt register via circuits 210-230, based on their preconfigured address.

In one embodiment, a direct line interrupt only alters one bit in the corresponding interrupt register (ie only sets one bit to logic 1). In the event that that multiple direct line interrupts come in simultaneously and each alter their own bit in the register, the interrupt handling software on the target can trace back and figure out who set the bits without any race conditions.

MMIO reading circuit 204 is connected to the interrupt registers and is capable of reading the contents of any of the interrupt registers. Fabric slave circuit 200 will receive an MMIO read request with an address, and pass that address to MMIO reading circuit 204 to perform a read process. MMIO reading circuit 204 will use the address to access the appropriate interrupt register, read the contents of that register, and provide the contents back to fabric slave circuit 200, which will then provide the data onto the fabric 102 for transmission to the requester of the read operation.

In operation, a source of an interrupt can send an MMIO based interrupt via fabric slave circuit 200 or a line interrupt via the input interrupt lines. If sending a line interrupt, the appropriate input interrupt line (interrupt line 0, interrupt line 1, interrupt line 2, interrupt line 3, . . . ) will be asserted, line interrupt routing circuit 270 will generate 32 bits of data and that data will be routed to the preconfigured interrupt register. In the example where there are only four line inputs, data can only be routed to one of four interrupt registers of the total set of interrupt registers. At least one of the bits stored into the interrupt register will be a one which will cause the output of the corresponding AND gate (240-258) to assert an interrupt on the appropriate output interrupt line. The target of the output can then perform an MMIO read in order to access the full contents of the interrupt register to determine what tasks need to be performed and/or the source of the interrupt.

A source of an interrupt can also perform an MMIO type interrupt by sending an MMIO write request via fabric 102. That MMIO write request will be received by fabric slave circuit 200, and the address and data will be routed to MMIO interrupt routing circuit 202. In one embodiment, MMIO interrupt routing circuit 202 will use the MMIO address to route the MMIO data to the appropriate interrupt register. At least one of the bits of the MMIO data must be a logic one so that the appropriate output interrupt line will be asserted. The target of the interrupt will then perform an MMIO read in order to obtain the contents of the interrupt register via MMIO reading circuit 204. The target will use the contents of the appropriate interrupt register in order to determine what tasks and/or what source of the interrupt.

Fabric slave circuit 200 and/or AND gates 274-280 can receive multiple interrupt requests for a same target. MMIO interrupt routing circuit 202 and/or line interrupt routing circuit 270 are configured to route the interrupt requests to interrupt registers corresponding to target interrupt lines so that multiple interrupt requests for the same target active at overlapping time periods get routed to the same interrupt register and concurrently populate the same interrupt register with different data indicating different work to be done for respective interrupts. This feature is accomplished using the non-destructive writing to the interrupt registers described below.

In one embodiment, MMIO interrupt routing circuit 202, Line Interrupt Routing Circuit 270 and the interrupt registers are all configurable. That is, the architecture depicted in FIG. 2 configurable in a number of dimensions, including the number of bits associated with an output interrupt line, the number of output interrupt lines, the number of input interrupt lines, etc.

Figure 3:
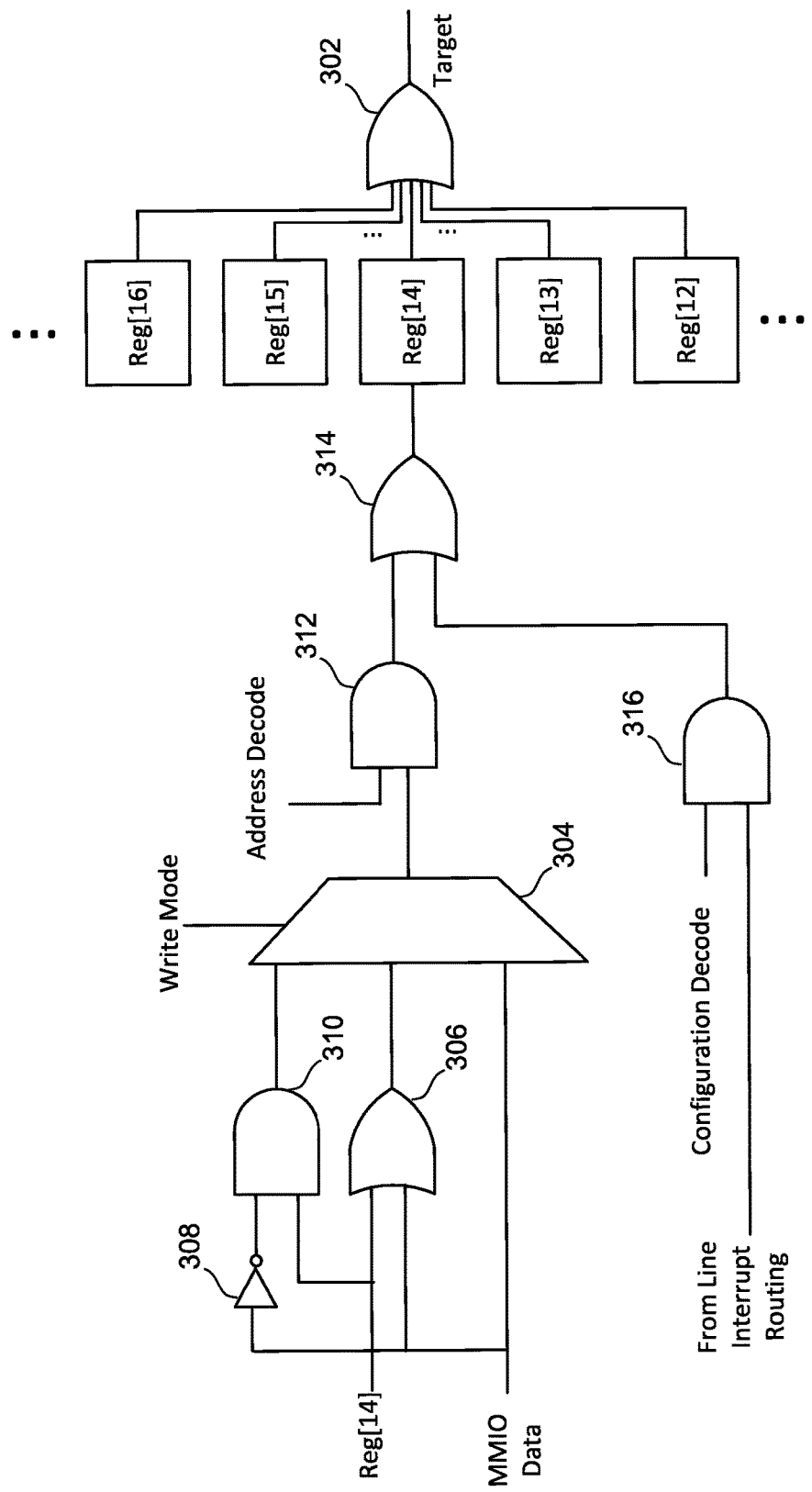
FIG. 3 is a schematic diagram of a portion of one embodiment of a circuit that can set a bit of an interrupt register.

FIG. 3 is a schematic diagram depicting a portion of an interrupt register and the corresponding write mode circuit (see 210-230 of FIG. 2). For example if the interrupt register depicted in FIG. 3 is interrupt register 0-0, then the components of FIG. 3 can be found in write mode circuit 210. As discussed above, in one embodiment, the interrupt register includes 32 bits. FIG. 3 only shows five of those 32 bits as Reg[12], Reg[13], Reg[14], Reg[15], and Reg[16]. In other embodiments, more or less than 32 bits can be used.

The circuit of FIG. 3 has three inputs, depicted on the left side of the diagram. The signal Reg [14] is the current contents of one bit, Reg [14], in the interrupt register. The signal MMIO Data is one bit of the MMIO write data received by fabric slave circuit 200 and provided to MMIO interrupt routing circuit 202 for routing to the appropriate interrupt register. This is the one bit of data destined for Reg [14]. The signal MMIO Data is provided to one input of multiplexer 304, an input of inverter 308 and an input of OR gate 306. This current data Reg [14] is connected to another input of OR gate 306 and an input of AND gate 310. The output of AND gate 310 is provided to an input of multiplexer 304. The output of OR gate 306 is provided to multiplexer 304. The output of multiplexer 304 is provided to an input AND gate 312. The signal Address Decoded (received from MMIO interrupt routing circuit 202) is also provided to an input of AND gate 312. The output of AND gate 312 is connected to one input of OR gate 314. The other input to OR gate 314 is from the output od AND gate 316. The output of OR gate 314 is provided to the input of Reg [14] of the interrupt register. There are two inputs to AND 316: one input is a configuration decode signal and the other is a data line from the line interrupt routing circuit 270 representing one of the data bit generated by line interrupt routing circuit 270, as discussed above. The configuration decode signal is also from line interrupt_routing circuit 270 and is provided as a decoding signal to allow the data to pass to their interrupt register or prevent it from passing to the interrupt register.

FIG. 3 also shows OR gate 302 that performs the logical OR of all of the bits in the interrupt register. The output (labelled Target) is provided to the corresponding output interrupt line. If any of the bits of the interrupt register are logic one, then the output of OR gate 302 is at logic one and the corresponding output interrupt line for the target of the interrupt is asserted.

When writing MMIO data, one embodiment includes three write modes. In one mode the circuit of FIG. 3 allows the new data to be written to the interrupt register by overwriting any existing contents of the interrupt register. In another embodiment, the MMIO register is added to the existing contents so that the existing contents is not destroyed. In this case, the new MMIO write data is logically ORed with the existing content. This can be referred to as a set operation. In a third write mode, known as a reset operation, the MMIO data is inverted and then ANDed with the existing content in order to remove the existing content. The third reset mode can be used by a target of an interrupt in order to clear the interrupt.

As discussed above, fabric slave circuit 200 receives an MMIO address. In one embodiment, the MMIO address is a 32 bit address. Of those 32 bits, 17 bits are used to address the interrupt controller. The remaining 15 bits is an address offset to the address of the interrupt controller. FIG. 4 shows one example of an address offset. FIG. 5 is a table providing an explanation of the various fields of FIG. 4. Bit 0 and bit 1 are always set to 0 so that every address is four bit aligned. Bits 2 and 3 identifies a write mode. As discussed above, in one embodiment, there are three write modes: write (00), set (01) and reset (10). In other embodiments, there can be more than three write modes, less than three write modes or different write modes. Bit 4, 5 and 6 identify an Output interrupt line. For example, as depicted in FIG. 2, a particular core (or other type of block) can have three (or a different number of) output interrupt lines. Bits 4, 5 and 6 are used to select the appropriate output interrupt line for the core (or other type of block). Bits 7-13 are used to identify the processor/core or other type of block (as not all targets have to be cores). Bit 14 indicates whether the address is for an interrupt register or a configuration register.

Figure 6:
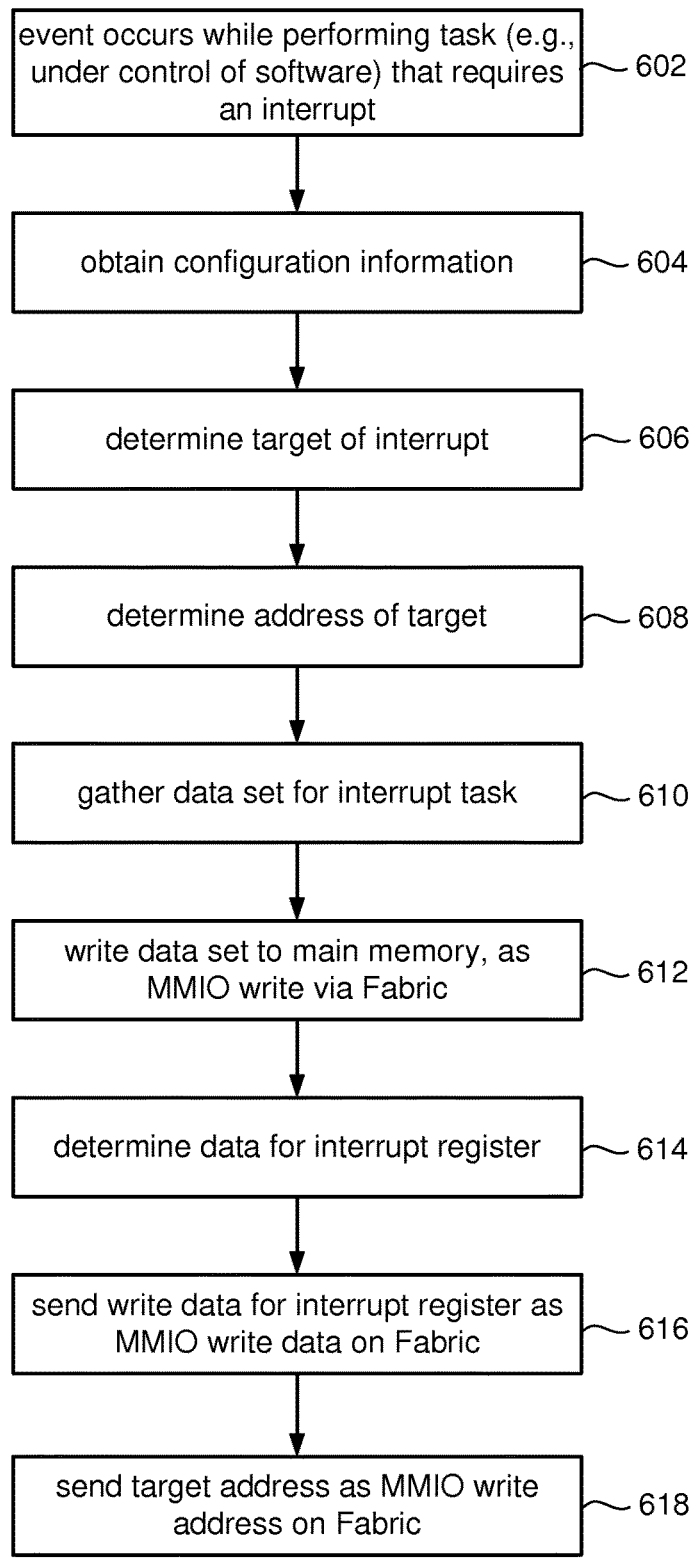
FIG. 6 is a flow chart describing one embodiment of a process performed by a source entity asserting a MMIO interrupt through the interrupt controller.
Figure 7:
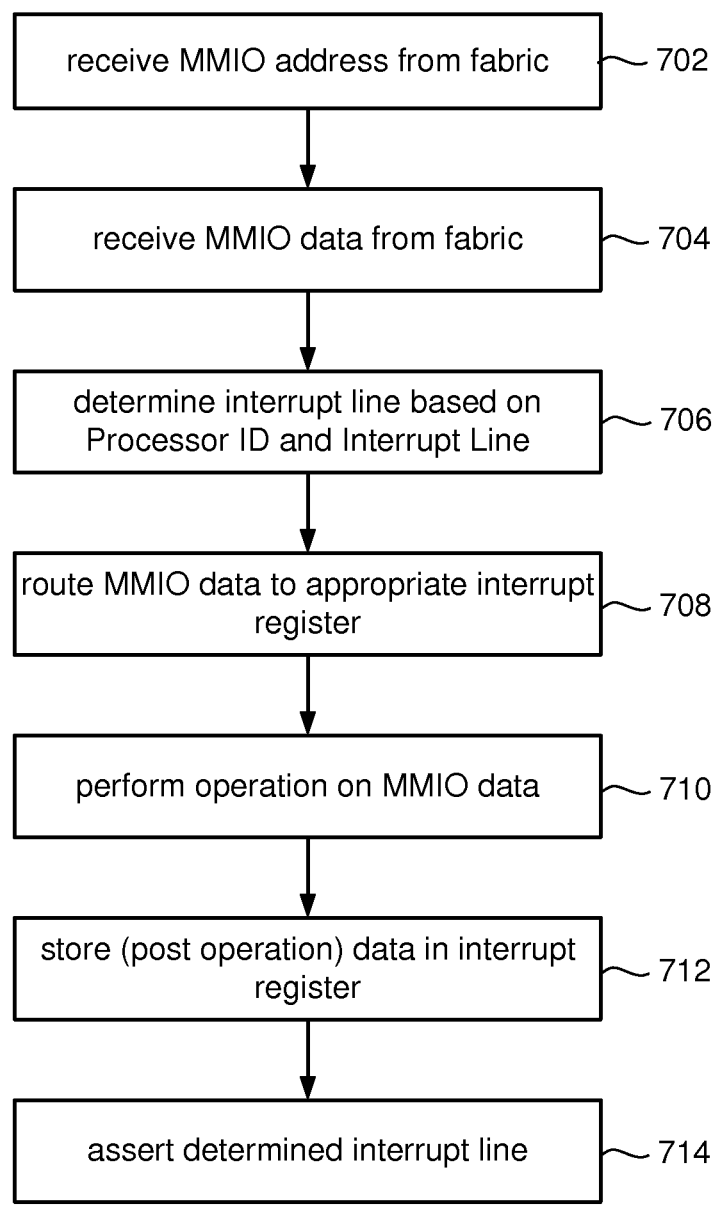
FIG. 7 is a flow chart describing one embodiment of a process performed by the interrupt controller in response to an MMIO interrupt request.
Figure 8:
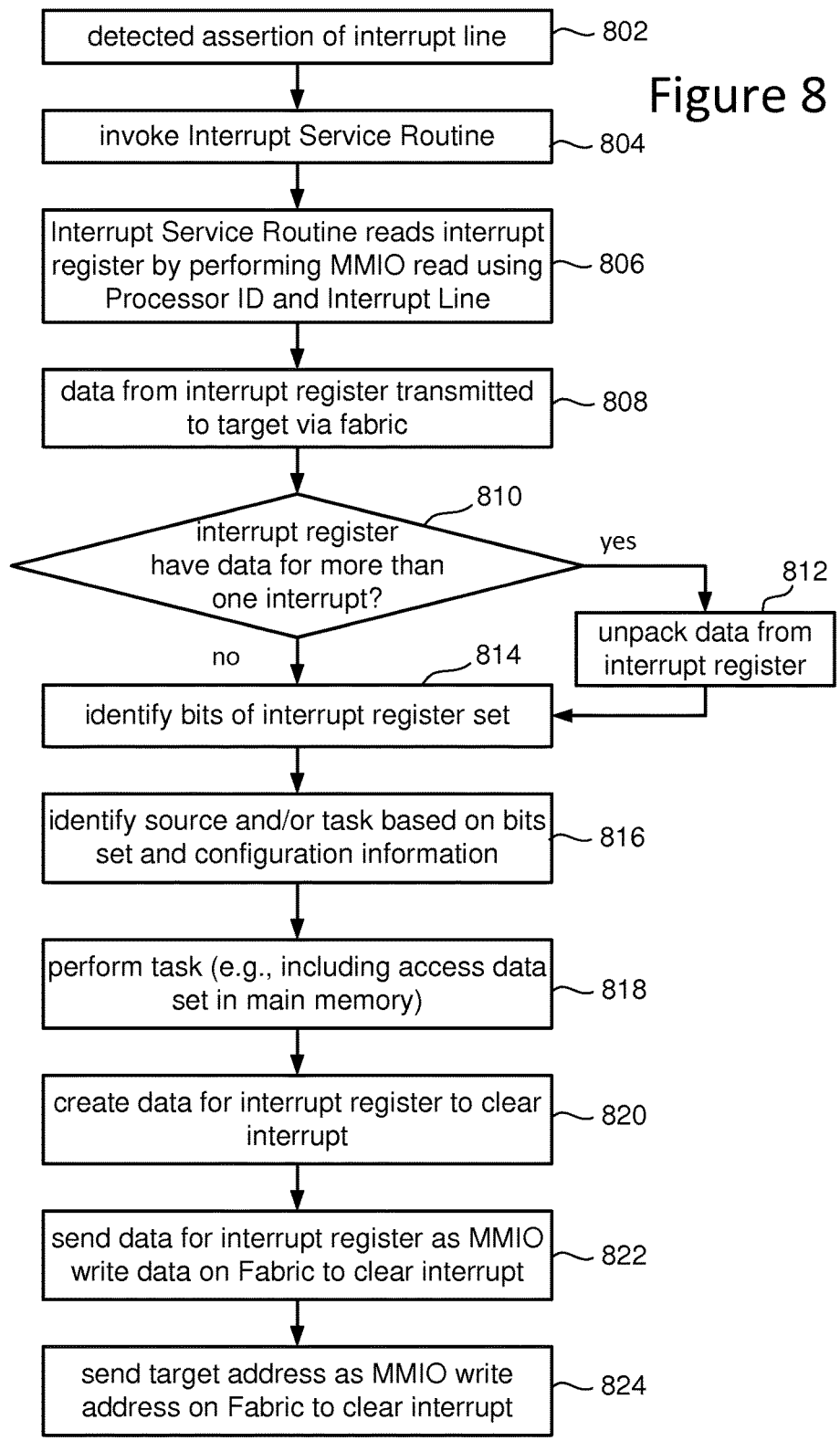
FIG. 8 is a flow chart describing one embodiment of a process performed by the target of an interrupt in response to the interrupt from the interrupt controller.

FIGS. 6, 7 and 8 are flowcharts which depict example operations for an MMIO based interrupt. FIG. 6 is a flowchart describing one embodiment of a process performed by a source of an MMIO interrupt. In step 602, an event occurs while the source is performing a task. In one embodiment, the source is a processor (e.g., any of processors 106-118 of FIG. 1, or other processor) that is performing a task under the control of software. Some event occurs that requires a task to be performed by another processor or entity. Therefore, the source must assert an interrupt to get that other processor or entity to perform the task. In step 604, the source obtains configuration information so that it can identify the appropriate address and the appropriate write data associated with the interrupt. This information can be configured into software. In other embodiments, tables and/or main memory (e.g., DRAM 122) can include the configuration information. In other embodiments the information can be hardwired into a circuit. In step 606, based on the configuration information, the source will determine the target of the interrupt. In step 608, the source determines the address of the target. In step 610, the source gathers a set of data for the task to be used by the target of the interrupt. In one embodiment, the task that the source wants the target to perform may involve performing one or more operations on the set of data. That data needs that to be operated on will be gathered in step 610. In step 612, the source writes that data to some location in main memory by performing an MMIO write via fabric 102. In some embodiments, steps 610 and 612 are not performed, as data may not be written to main memory for the interrupt.

In step 614, the source determines the data to be stored in the appropriate interrupt register for the target. In the embodiment where there are 32 bits in the interrupt register, the source will determine the value of the 32 bits. In other embodiments, the source can simply determine which bits are logic one. In step 618, the source performs an MMIO write. That is, in step 616, the source will send the write data for the interrupt register as MMIO write data on the fabric. In step 618, the source will send the target address as an MMIO write address on the fabric 102. The address put on fabric 102 in step 618 is a 32 bit address with a portion of the address used to identify interrupt controller 104 and the lower 15 bits used as per FIGS. 4 and 5 to address the appropriate interrupt register and output interrupt line in the interrupt controller 104. Steps 616 and 618 comprise the source sending a MMIO write request to interrupt controller 104.

FIG. 7 is a flowchart describing one embodiment of a process performed by interrupt controller 104 in response to the MMIO interrupt request received from fabric 102 (i.e., in response to the process of FIG. 6). In step 702 of FIG. 7, interrupt controller 104 receives an MMIO address from fabric 102 at fabric slave circuit 200. In step 704, interrupt controller 104 receives the MMIO data from fabric 102 fabric slave circuit 200. Steps 702 and 704 comprise fabric slave circuit 200 receiving an MMIO write request. In step 706, MMIO interrupt routing circuit 202 determines the interrupt output line based on the processor ID and interrupt line in the address (see FIGS. 4 and 5). In step 708, MMIO interrupt routing circuit 202 routes the MMIO data to the appropriate interrupt register. In step 710, the write mode circuit of interrupt controller 104 performs the appropriate operation on the MMIO data. For example, based on the write mode, the data can be logically OR'd with existing content or inverted and logically AND'd with the existing content. After performing that operation on the MMIO data, if any, the post operation data is stored in the appropriate interrupt register in step 712. Because at least one bit of the data stored in the interrupt register should now be a logic one, and all of the bits are OR'd together, the corresponding output interrupt line connected to the interrupt register is asserted in step 714.

FIG. 8 is a flowchart describing one embodiment of a process performed by the target of an interrupt in response to the interrupt being asserted by the interrupt controller. That is the process of FIG. 8 will be performed by the target in response to the process of FIG. 7 being performed by interrupt controller 104. In step 802, the target detects the assertion of its interrupt line. In step 804, the target invoke its interrupt service routine, which in one embodiment is software that runs on the target for servicing interrupts. In step 806, the interrupt service routine reads the appropriate interrupt register by performing an MMIO read via fabric 102 and using its own Processor ID and Interrupt Line (see FIGS. 4 and 5) in the MMIO address in order to access the appropriate interrupt register. In step 808, the data from the interrupt register is transmitted to the target via fabric 102. In step 810, the target determines whether the interrupt register has data for more than one interrupt. As explained above, it is possible that when the data was written to the interrupt register there was existing data. In order to write the new data without destroying the existing data, the new data is logically OR'd with the existing data. In one embodiment, each interrupt only gets to set one bit of data in the interrupt register. Therefore, if there are more than one bit set, then the target knows there is data for more than one interrupt. The target will only service one interrupt at a time. Therefore the target will unpack the data and choose one of the interrupts to service. In other embodiments, there can be other mathematical functions for packing and unpacking data for multiple interrupts. If the interrupt register has data for more than one interrupt, it is unpacked in step 812. If the interrupt register did not have data for more than interrupt then the process continues at step 814 and the target identifies the bits of interrupt register that are set to logic one. Based on that set bit, the target identified the source and/or task that needs to be performed. Step 816 can be based on configuration information from the software. In step 818, the target will perform the task corresponding to the bit(s) read from the interrupt register. In one embodiment, step 818 includes accessing the data that was written to main memory by the source in step 612 of FIG. 6. In one example implementation, the data that is read from main memory includes identification of additional tasks, as well as data. After step 818 is completed, the task associated with the interrupt has been completed. Therefore, the interrupt service routine may clear the interrupt. In step 820, the interrupt service routine will create a data set (32 bits in one embodiment) to be used to clear the interrupt information from the interrupt register. In step 822, the data created in step 822 is sent by the target as part of an MMIO write to the fabric using its own Processor ID and Interrupt Line (see FIGS. 4 and 5) in the MMIO address in order to access the appropriate interrupt register. That MMIO address and write data will be received by fabric slave circuit 200 and provided to MMIO interrupt routing 202, which will then write the data to the appropriately addressed register. The MMIO address transmitted in step 826 will have a write mode (see FIG. 5) of 10, corresponding to reset so that the data will be inverted and ANDed with the existing data in order to reset the data to 0.

Figure 9:
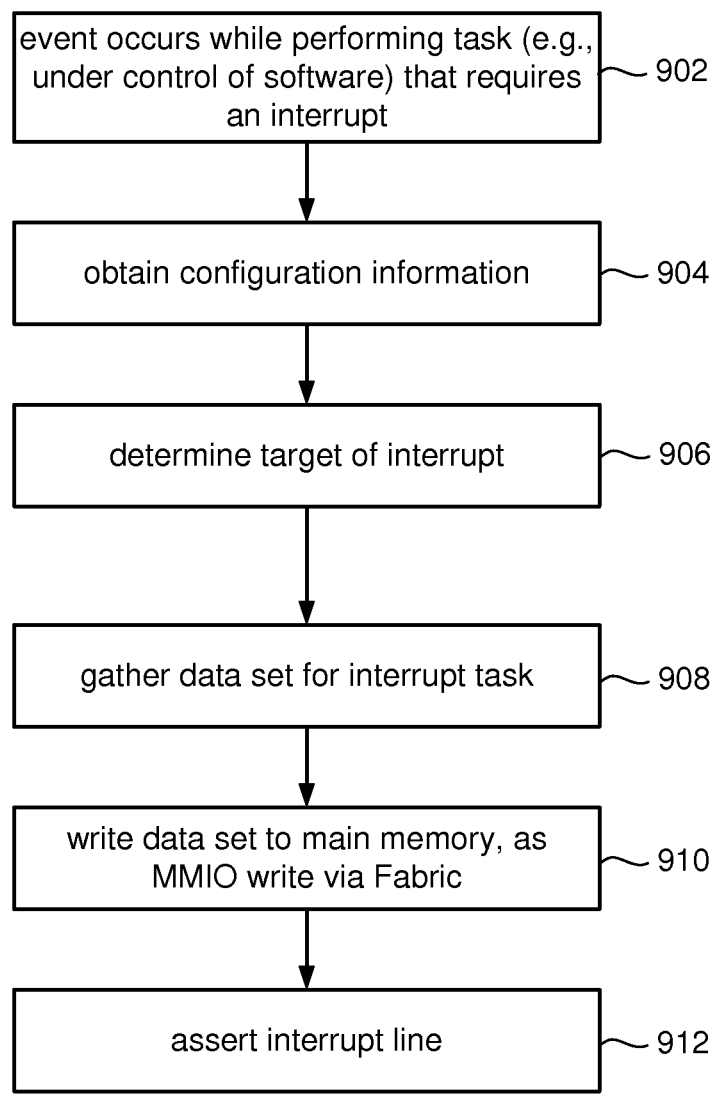
FIG. 9 is a flow chart describing one embodiment of a process performed by a source entity asserting a line interrupt through the interrupt controller.
Figure 10:
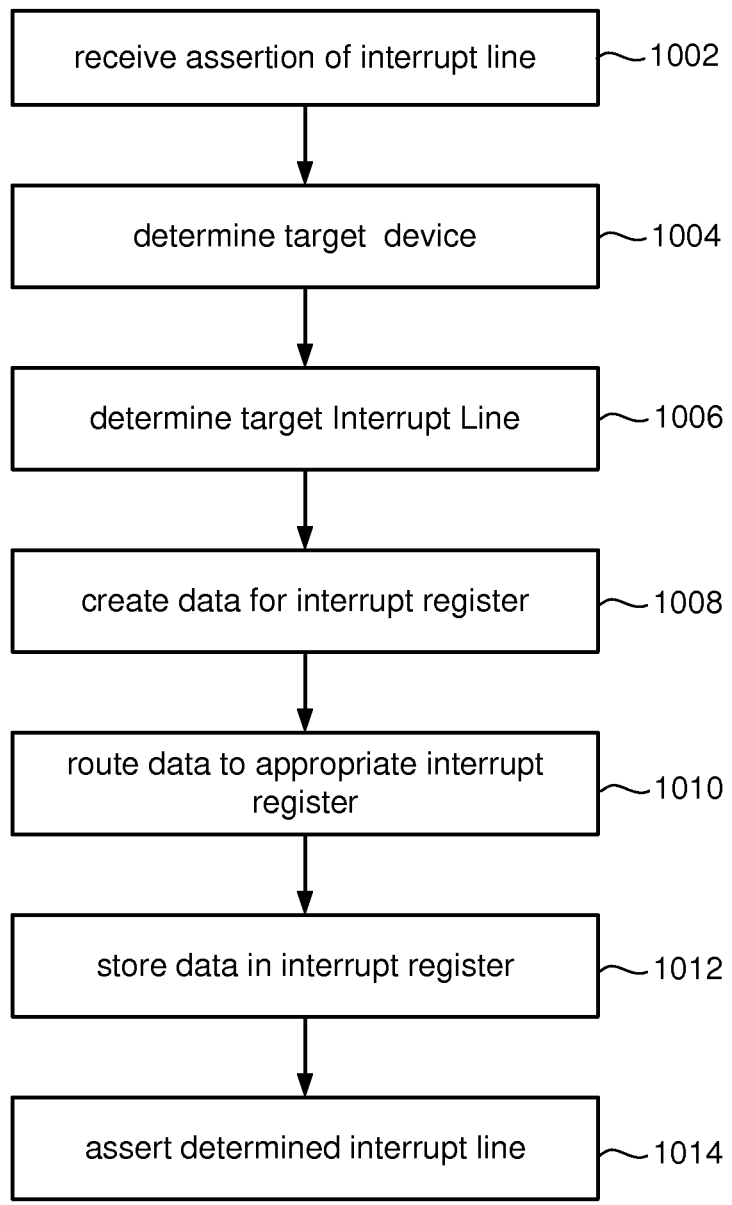
FIG. 10 is a flow chart describing one embodiment of a process performed by the interrupt controller in response to a line interrupt request.

As described above, interrupt controller 104 can receive MMIO type interrupt requests as well as line interrupt requests. FIG. 9 is a flowchart describing one embodiment of a process performed by a source entity to assert a line interrupt through the interrupt controller. FIG. 10 is a flowchart describing one embodiment of a process performed by interrupt controller 104 in response to receiving a line interrupt request. The target of the interrupt will perform the process of FIG. 8 in response to receiving an interrupt based on a line interrupt request.

In step 902 of FIG. 9, an event occurs while performing a task (similar to step 602 described above). In step 904, the source obtains configuration information so that it can identify the appropriate address and the appropriate write data associated with the interrupt. This information can be configured into software. In other embodiments, tables and/or main memory (e.g., DRAM 122) can include the configuration information. In other embodiments the information can be hardwired into a circuit. In step 906, the source determines the target of the interrupt based on the configuration information from step 904. In step 908, the source gathers a dataset for the interrupt task. In step 910, the gathered data set can be written to main memory in a predetermined location via an MMIO write using the fabric. In some embodiments, steps 908 and 910 will not be performed, as data may not be written to main memory for the interrupt. In step 912, the source assert the appropriate line interrupt, such as (for example) input interrupt lines depicted in FIG. 2 (Interrupt Line 0, Interrupt Line 1, Interrupt Line 2 or Interrupt Line 3).

FIG. 10 is a flowchart describing one embodiment of a process performed by the interrupt controller in response to receiving a line interrupt request. In one embodiment, the process of FIG. 10 is performed in response to the process of FIG. 9. In step 1002, interrupt controller 104 receives an assertion of one of its interrupt lines (see, e.g., Interrupt Line 0, Interrupt Line 1, Interrupt Line 2 or Interrupt Line 3 of FIG. 2). In step 1004, line interrupt routing circuit 270 determines the target device. In step 106, line interrupt routing circuit 270 determines the target's output interrupt line that will be used to assert the interrupt. As discussed above, some target devices can have more than one interrupt line. In step 1008, line interrupt routing circuit 270 creates the multi-bit data to be stored in the interrupt register. As discussed above, each interrupt register stores 32 bits of data; therefore, line interrupt routing circuit 270 create 32 bits of data. In one example implementation, of the 32 bits, 31 are logic zero and one would be logic one. In other embodiments, more than one bit can be logic one. One embodiment steps 1004, 1006 and 1008 are performed based on configured information such as configuration information found in configuration register(s) 272. In step 1010, line interrupt routing circuit 270 routes the created data to the appropriate interrupt register. In step 1012, that data is stored in the interrupt register (e.g., via AND gate 316 and OR gate 314 of FIG. 3). In step 1014, because at least one bit of the interrupt register is set to one, the corresponding output interrupt line is asserted in step 1014.

As discussed above, it is possible that two sources will assert an interrupt to the same target, and even the same output interrupt line, at the same or overlapping times. In that instance, the write mode is designed to allow two sets of data to be added to the appropriate interrupt register and allow the target to distinguish multiple interrupts. In one embodiment, MMIO interrupt routing circuit 202 and/or line interrupt routing circuit 270 are configured to route interrupt request data into interrupt registers such that multiple interrupt requests for the same target active at overlapping time periods get routed to a same interrupt register and concurrently populate the same interrupt register with different data indicating different tasks to be done for different respective interrupts. As depicted in FIG. 3, if any one bit of the interrupt register is logic one, and therefore if any interrupt is still active, the corresponding interrupt output line will continue to be asserted.

Figure 11:
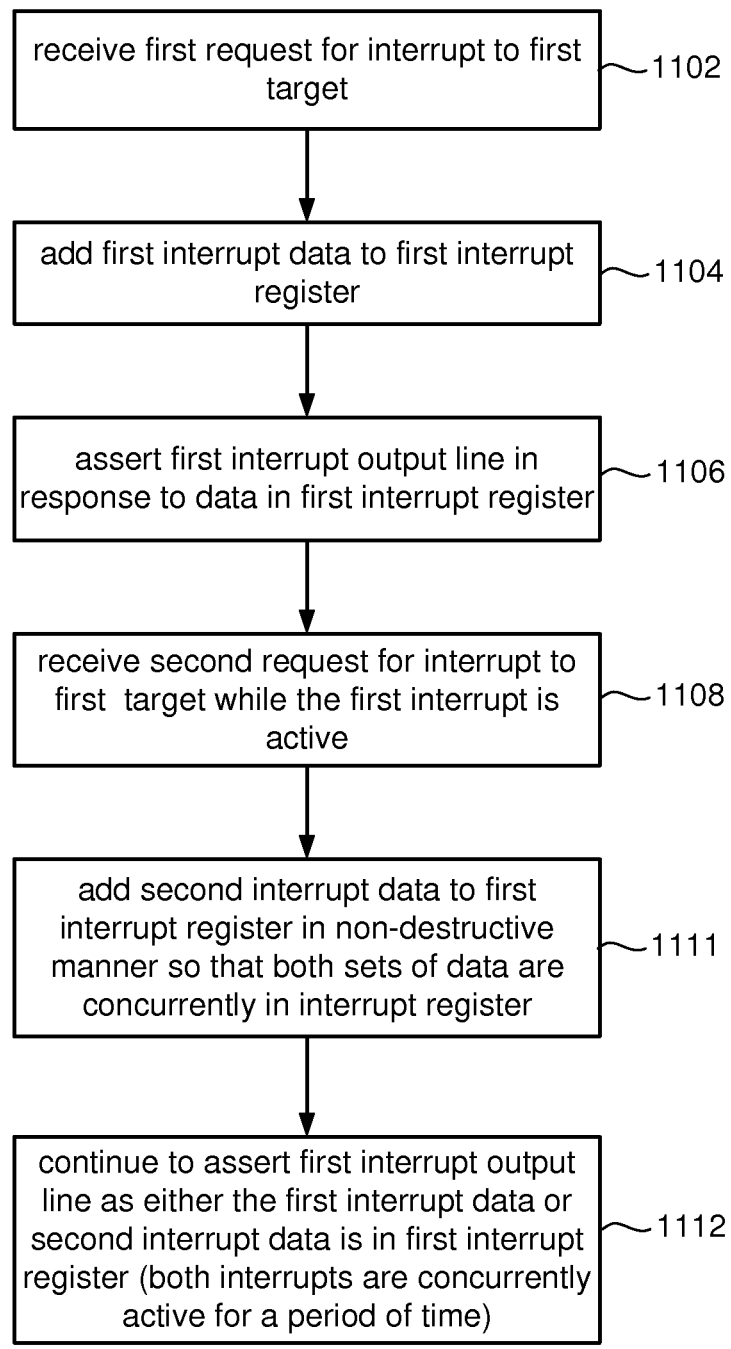
FIG. 11 is a flow chart describing an example process performed when two source entities requests interrupts to the same target.

FIG. 11 is a flowchart describing example process performed when two source entities request interrupt to the same target. The process of FIG. 11 is performed by interrupt controller 104. In step 1102, interrupt controller 104 receives a first request (e.g., MMIO write request that includes an MMIO address and MMIO write data) for a first interrupt for a first target. In step 1104, first interrupt data (e.g., MMIO write data that indicates a task to be performed) for that first interrupt will be stored in the first interrupt register. Step 1104 includes performing the process of FIG. 6 (or the process of FIG. 9). In step 1106, the first interrupt output line will be asserted in response to the data in the first interrupt register. In step 1108, the interrupt controller will receive a second request (e.g., MMIO write request that includes an MMIO address and MMIO write data) for a second interrupt to the first target while the first interrupt is still active. In another embodiment, step 1108 includes receiving a line interrupt request (e.g. at Interrupt Line 0, Interrupt Line 1, Interrupt Line 2 or Interrupt Line 3) for an interrupt to the same first target. In step 1110, second interrupt data (e.g., data that indicates a task to be performed) for the second interrupt will be routed to and stored in the first interrupt register in a nondestructive manner so that both sets of data are concurrently in the interrupt register. Step 1110 can include performing the process of FIG. 6 for an MMIO based interrupt or the process of FIG. 9 for a line based interrupt. If the interrupt is a line based interrupt then line interrupt routing circuit 270 generates the multiple (e.g., 32) bit second interrupt data. MMIO interrupt routing circuit 202 and/or line interrupt routing circuit 270 are configured to route interrupt request data into interrupt registers such that multiple interrupt requests for the same target active at overlapping time periods get routed to a same interrupt register and concurrently populate the same interrupt register with different data indicating different tasks to be done for different respective interrupts. In step 1112, interrupt controller 104 will continue to assert the first interrupt output line as long as either the first interrupt data or the second interrupt data remains in the interrupt register. That is, the interrupt output line will continue to be asserted as long as either one of the interrupts are active and in this example, both interrupts are concurrently active for at least a period of time.

For the process of FIG. 11 consider example where both general processor 110 and general processor 112 both want to perform an interrupt to video processor 118. In one example, general processor 110 sends an MMIO write request with MMIO write data to interrupt controller 104 in order to assert output interrupt line core0 Interrupt2 (for example) while general processor 112 asserts Interrupt Line 3 (for example). The two interrupts overlap in time. Therefore, the data from both interrupts will be concurrently stored in the interrupt register 0-2, with the write modes being 01=set (see FIG. 5). Video processor 118, in response to output interrupt line core0 Interrupt2 being asserted, will perform an MMIO read of interrupt register 0-2 to obtain the contents of that interrupt register. Assuming that each of general processor 110 and 112 asserted one bit in the interrupt register, video processor 118 will see the two bits set and understand that there are two interrupts pending. Configuration information will be used to understand the significance of each bit and what task must be performed by each interrupt. After performing the task asserted with the first interrupt, video processor may perform an MMIO read in order to clear one of the bits in interrupt 1-2. After performing the second task, video processor 118 would perform another MMIO write to interrupt controller 104 in order to clear the second bit of interrupt register interrupt 1-2.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe one or multiple embodiments and do not necessarily refer to the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, two devices are "in communication" with each other is they can communicate via a direct or indirect (e.g., via one or more other parts) connection.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

One embodiment includes an interrupt controller, comprising: a fabric slave circuit connected to a fabric for a computing system, the fabric slave circuit configured to receive an MMIO write request including an MMIO address and MMIO write data, the MMIO write data includes an indication of a task to be done for a MMIO interrupt; a plurality of output interrupt lines; a plurality of interrupt registers, each interrupt register corresponds to at least one output interrupt line of the plurality of output interrupt lines; and a MMIO routing circuit connected to the fabric slave and the plurality of interrupt registers. The MMIO routing circuit is configured to route the received MMIO write data to a targeted interrupt register corresponding to a targeted output interrupt line identified by the received MMIO address so that the targeted interrupt register stores the indication of the task to be done for the MMIO interrupt. Storing of the indication of the task to be done for the MMIO interrupt in the targeted interrupt register triggers assertion of the targeted output interrupt line.

One alternative further includes a reading circuit, connected to the fabric slave circuit and the plurality of interrupt registers, configured to enable the reading of the contents of the interrupt registers in response to an MMIO read received at the fabric slave circuit.

In one example implementation, the computing system includes multiple source entities connected to the fabric, the computing system includes multiple targets connected to the output interrupt lines, and the fabric slave circuit is configured to route MMIO write requests received from any of the source entities to any of the targets based MMIO addresses.

One embodiment includes a method of processing interrupts, comprising: receiving an MMIO write request including an MMIO address and MMIO write data, the MMIO write data includes an indication of first work to be done for a first interrupt for a first target; storing the MMIO write data, including the indication of a first task to be done for the first interrupt, in a data store; receiving a line interrupt signal for a second interrupt for the first target; automatically generating multiple bit line interrupt data that includes an indication of a second task to be done for the second interrupt for the first target; storing the multiple bit line interrupt data in the data store; and asserting an interrupt signal to the first target.

One embodiment includes a circuit for processing interrupts, comprising: a communication interface circuit configured to receive multiple interrupt requests for a same target; a plurality of output interrupt lines connected to targets; a plurality of interrupt registers, each interrupt register corresponds to one output interrupt line of the plurality of interrupt lines; routing circuitry connected to the communication interface circuit and the plurality of interrupt registers, the routing circuitry configured to route the interrupt requests to interrupt registers corresponding to target interrupt lines so that multiple interrupt requests for the same target active at overlapping time periods get routed to the same interrupt register and concurrently populate the same interrupt register with different data indicating different work to be done for respective interrupts, populating interrupt registers causes corresponding output interrupt lines to be asserted; and a reading circuit connected to the communication interface circuit and the plurality of interrupt registers such that the reading circuit is configured to enable the reading of the contents of the interrupt registers in response to requests to read received at the communication interface circuit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An interrupt controller, comprising:
a fabric slave circuit to connect to a fabric for a computing system, the fabric slave circuit configured to receive requests for MMIO interrupts for different interrupt targets in the form of MMIO write requests received from the fabric, each of the MMIO write requests include a respective MMIO address and respective MMIO write data, the respective MMIO write data includes an indication of a task to be done for a respective MMIO interrupt;
a plurality of output interrupt lines that connect to the different interrupt targets; a plurality of interrupt registers, each interrupt register corresponds to at least one output interrupt line of the plurality of output interrupt lines, each interrupt register is configured to store one or more indications of tasks to be done for one or more MMIO interrupts for the corresponding output interrupt line, storing one or more indications of tasks to be done for one or more MMIO triggers assertion of the corresponding output interrupt line; and
a MMIO routing circuit connected to the fabric slave circuit and the plurality of interrupt registers, the MMIO routing circuit configured to route MMIO write data received from the fabric by the fabric slave circuit to any of the interrupt registers based on the respective MMIO address.

2. The interrupt controller of claim 1, further comprising:
a reading circuit, connected to the fabric slave circuit and the plurality of interrupt registers, configured to enable the reading of the contents of the interrupt registers in response to an MMIO read received at the fabric slave circuit.

3. The interrupt controller of claim 1, wherein:
the MMIO routing circuit is configured to route the interrupt requests to interrupt registers so that multiple interrupt requests for a same target active at overlapping time periods get routed to a same interrupt register and concurrently populate the same interrupt register with different data indicating different tasks to be done for respective interrupts, populating interrupt registers with data causes corresponding output interrupt lines to be asserted.

4. The interrupt controller of claim 1, further comprising:
write mode circuitry to communicate with the MMIO routing circuit and the interrupt registers, the MMIO address includes a write mode indication; and
wherein the write mode circuitry is configured to cause the MMIO write data to be written over existing contents of the target interrupt register, cause the MMIO write data to be written into the target interrupt register without losing the existing contents of the target interrupt register, cause the MMIO write data to be combined with the existing contents of the target interrupt register, based on the write mode indication.

5. The interrupt controller of claim 1, further comprising:
a plurality of input line interrupts; and
a line interrupt routing circuit connected to the input line interrupts and the interrupt registers so that interrupt requests received at the input line interrupts cause data to be added to the interrupt registers, adding data to the interrupt registers causes corresponding output interrupt lines to be asserted.

6. The interrupt controller of claim 1, further comprising:
a plurality of input line interrupts; and
a line interrupt routing circuit connected to the input line interrupts and the interrupt registers, in response to a received line interrupt the line interrupt routing circuit is configured to generate multiple bit interrupt data that includes an indication of a task to be done for the received line interrupt, the line interrupt routing circuit routes and stores the multiple bit interrupt data at an interrupt register corresponding to an output interrupt line associated with the received line interrupt, storing data in the interrupt registers causes corresponding output interrupt lines to be asserted.

7. The interrupt controller of claim 6, further comprising:
a configuration register to communicate with the line interrupt routing circuit, the line interrupt routing circuit is configurable to generate customized multiple bit interrupt data based on contents of the configuration register.

8. The interrupt controller of claim 1, further comprising:
a plurality of input line interrupts; and
a line interrupt routing circuit to communicate with the input line interrupts and the interrupt registers, in response to a received line interrupt the line interrupt routing circuit is configured to generate multiple bit interrupt data that includes an indication of work to be done for the received line interrupt, the line interrupt routing circuit routes to and stores the multiple bit interrupt data in the targeted interrupt register, storing data in the target interrupt register causes corresponding targeted output interrupt lines to be asserted.

9. The interrupt controller of claim 8, wherein:
the interrupt controller is configured to store the MMIO write data in the targeted interrupt register during a first time period;
the interrupt controller is configured to receive the line interrupt while the MMIO interrupt is active; and
the interrupt controller is configured to store the multiple bit line interrupt data in the targeted interrupt register during a second time period that overlaps with the first time period.

10. The interrupt controller of claim 1, wherein:
each interrupt register includes a logical OR circuit, the output of the logical OR circuit is to be communicated to a corresponding output interrupt line; and
each interrupt register include a plurality of bits, each bit represents a task and is to be communicated to the logical OR circuit.

11. The interrupt controller of claim 1, wherein:
each interrupt register include a plurality of bits, at least one of the bits indicates that data for a target of the interrupt to use in conjunction with the interrupt is stored in a predefined location in main memory.

12. The interrupt controller of claim 1, wherein:
the computing system includes multiple source entities connected to the fabric;
the computing system includes multiple targets connected to the output interrupt lines; and
the fabric slave circuit is configured to route MMIO write requests received from any of the source entities to any of the targets based MMIO addresses.

13. A method of processing interrupts, comprising:
receiving an MMIO write request including an MMIO address and MMIO write data, the MMIO write data includes an indication of a first task to be done for a first interrupt for a first target;
storing the MMIO write data, including the indication of the first task to be done for the first interrupt, in a data store;
receiving a line interrupt signal for a second interrupt for the first target;
automatically generating multiple bit line interrupt data that includes an indication of a second task to be done for the second interrupt for the first target;
storing the multiple bit line interrupt data in the data store; and
asserting an interrupt signal to the first target.

14. The method of claim 13, wherein:
the line interrupt is received while the first interrupt is active;
the multiple bit line interrupt data is stored in the data store concurrently with the MMIO write data being stored in the data store;
the second interrupt is active while the first interrupt is active; and
the asserting the interrupt signal to the first target is performed while either of the multiple bit line interrupt data is stored in the data store or the MMIO write data is stored in the data store.

15. The method of claim 13, further comprising:
receiving an MMIO read request that includes the MMIO address; and
accessing and reporting the contents of the data store in response to the MMIO read request.

16. The method of claim 13, further comprising:
receiving an additional MMIO write request that includes the MMIO address and reset data; and
combining the reset data with current contents of the data store to reset the data store so that the interrupt signal is no longer asserted.

17. The method of claim 13, further comprising:
routing multiple the interrupt requests to interrupt registers so that multiple interrupt requests for a same target active at overlapping time periods get routed to a same interrupt register and concurrently populate the same interrupt register with different data indicating different tasks to be done for respective interrupts, populating interrupt registers with data causes corresponding output interrupt lines to be asserted, the data store is one of the interrupt registers.

18. A circuit for processing interrupts, comprising:
a communication interface circuit in communication with a bus configured to receive multiple interrupt requests via the bus for a same target;
a plurality of output interrupt lines for connection to targets;
a plurality of interrupt registers, each interrupt register corresponds to one output interrupt line of the plurality of interrupt lines;
routing circuitry connected to the communication interface circuit and the plurality of interrupt registers, the routing circuitry configured to route the interrupt requests to interrupt registers corresponding to target interrupt lines so that multiple interrupt requests for the same target active at overlapping time periods get routed to the same interrupt register and concurrently populate the same interrupt register with different data indicating different work to be done for respective interrupts, populating interrupt registers causes corresponding output interrupt lines to be asserted; and
a reading circuit connected to the communication interface circuit and the plurality of interrupt registers, the reading circuit configured to enable the reading of the contents of the interrupt registers and provide the contents of the interrupt registers to the bus via the communication interface circuit in response to requests to read received at the communication interface circuit from the bus.

19. The circuit for processing interrupts of claim 18, wherein:
the communication interface includes a bus slave and an interface for receiving line interrupt requests separate from the bus slave;
the routing circuitry includes a first routing circuit and a second routing circuit;
the first routing circuit is configured to communicate with the bus slave and the interrupt registers, the first routing circuit is configured to route interrupt data from the bus slave to a target interrupt register; and
the second routing circuit is configured to communicate with the interface, the second routing circuit is configurable to receive line interrupt requests and the interrupt registers for routing interrupt data to a target interrupt register.

20. The circuit for processing interrupts of claim 19, wherein:
- the second routing circuit is configured to generate multiple bit interrupt data in response to line interrupt requests and cause the generated multiple bit interrupt data to be stored in the interrupt registers; and
- the first routing circuit, the second routing circuit and meaning of bits in the interrupt registers configurable.

* * * * *